Patented Feb. 10, 1948

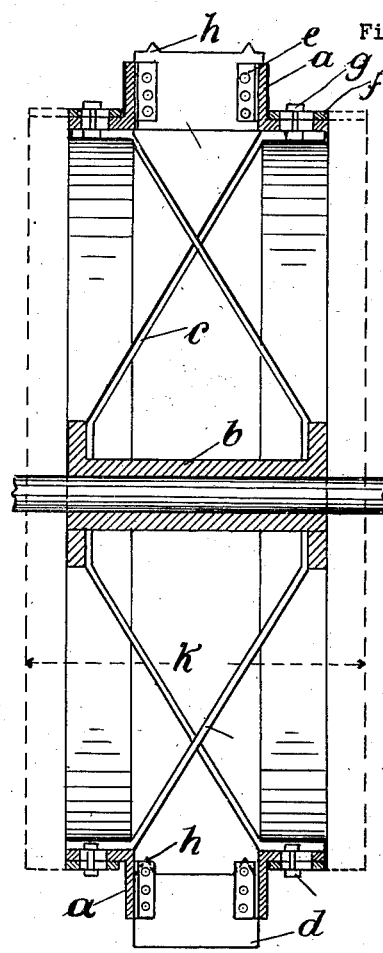
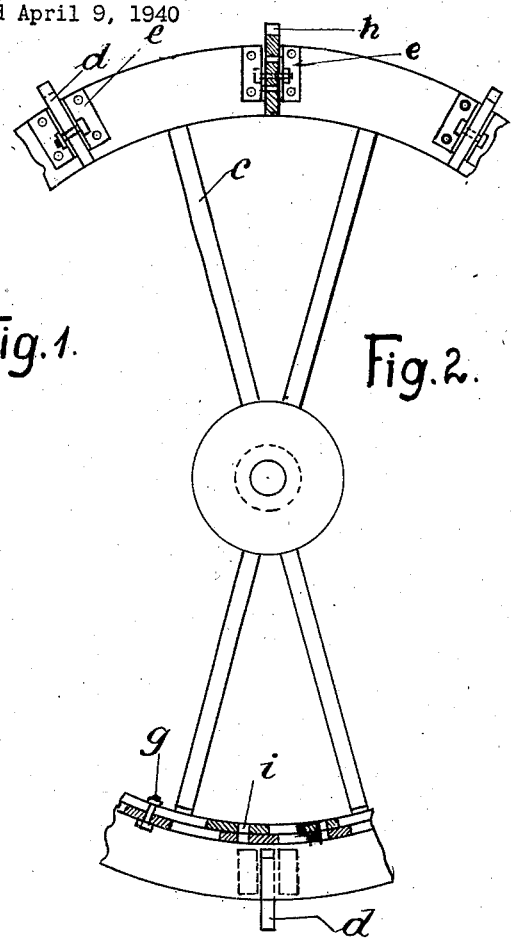
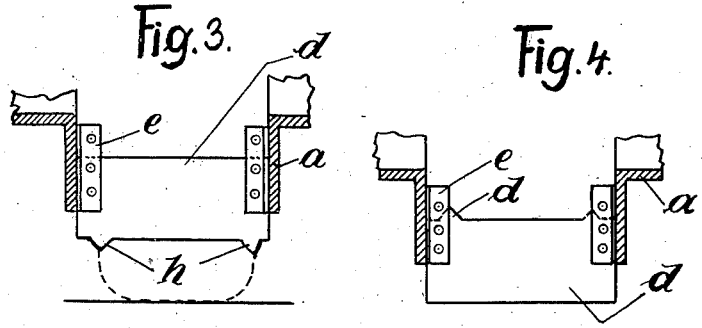
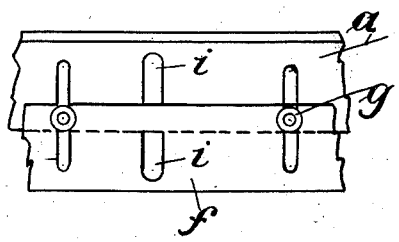

2,435,783

UNITED STATES PATENT OFFICE 2,435,783

RUNNING WHEEL FOR AGRICULTURAL VEHICLES

Gustav Hintze, Berlin N. W. 21, Germany; vested in the Attorney General of the United States Application April 9, 1940, Serial No. 328,673
In Germany June 3, 1937

Section 3, Public Law 690, August 8, 1946
Patent expires June 3, 1957

1 Claim. (Cl. 301—39)

This invention relates to running wheels for agricultural vehicles of that type in which the rim surface can be enlarged.

Such running wheels are employed chiefly for vehicles which serve for cultivating marshy grounds. When driving over such grounds the commonly used running wheels sink into the ground and clog, so that later on they do not grip on hard ground.

It has been proposed to provide shovel-like grippers or ribs, with which the inconvenience is also connected that running on hard ground is impossible.

It has further been proposed to use grippers which are screwed on to the rim and can be removed; this requires much time and besides the clogging of the intervals between the grippers is not avoided.

This invention has for its object to provide a running wheel for vehicles destined to run over uncultivated grounds as well as on grounds of any kind.

The running wheel according to the invention differs from the running wheels of known type in that the rim is composed of two parts bent at right angles so that the two vertical inner arms form a channel in which gripper plates are inserted. These gripper plates have preferably on one surface pointed projections arranged at a distance the one from the other, so that the interval between the projections can be filled by a rope or the like. On the horizontal portions of the rims shiftable rings are placed which have transverse slots same as the horizontal arms of the rims, so that earth can easily pass through these slots.

An embodiment of the invention is illustrated by way of example in the accompanying drawing, in which Fig. 1 shows the improved running wheel in vertical section, Fig. 2 is a side view of the running wheel partly in section, Figs. 3 and 4 show a gripper in two different positions, Fig. 5 shows a portion of the horizontal arm of a rim with a running ring shifted outward to enlarge the rim.

The rim is composed of two part rims $a$ of angular cross-section and connected with a hub $b$ by spokes or stays $c$. Grippers $d$ are inserted into guide pieces $e$ mounted between the vertical arms of the rim $a$. On the horizontal arm of each rim part $a$ a running ring $f$ is placed which has transverse slots $i$ communicating with transverse slots $i$ in the horizontal arm of the rim parts, and the shiftable rings are held in position by means of screw bolts $g$ extending through the transverse slots $i$. The running rings $f$ can be shifted outwards on the horizontal arms, as shown in Fig. 1 in dash lines and in Fig. 5 in top plan view. The gripper plates $d$ have on one of their ends two pointed projections $h$. If the vehicle equipped with the running wheel according to the invention has to run on streets leading to the uncultivated ground, the grippers $d$ are inserted between the vertical arms of the rims $a$ as shown in Fig. 1, so that the pointed projections $h$ are turned outwards, and only these pointed projections are in touch with the road. The interval between the projections $h$ may be filled with a rope placed around the wheel, as indicated in Fig. 3 in dash lines.

If the vehicle has to run on fields or uncultivated ground the grippers $d$ are turned upside down into the position shown in Fig. 4, and the running surface of the wheel is enlarged by shifting the rings $f$ on the horizontal arms of the rims to enlarge the running surface of the wheel to the size $k$ indicated in dash lines in Fig. 1.

I claim:

A running wheel for agricultural vehicles, comprising in combination with a hub, a rim composed of two parts each one of rectangular cross-section and fixed on said hub by means of spokes the horizontal arm of said rim parts having transverse slots, and flat rings having transverse slots placed on said horizontal arms so that they can be shifted outwards and inwards, screw bolts extending through said transverse slots in the shiftable rings and in the horizontal arms of the rim parts.

GUSTAV HINTZE.

REFERENCES CITED

The following references are of record in the file of this patent:

UNITED STATES PATENTS

| Number | Name | Date |
|---|---|---|
| 683,220 | Neill et al. | Sept. 24, 1901 |
| 745,510 | McLaughlin | Dec. 1, 1903 |
| 1,240,337 | Gray | Sept. 18, 1917 |
| 1,331,575 | Marien | Feb. 24, 1920 |
| 1,420,871 | Scotti | June 27, 1922 |
| 1,630,025 | Ostdiek | May 24, 1927 |